No. 796,339. PATENTED AUG. 1, 1905.
W. T. MERCIER.
METHOD OF IMPROVING, BLEACHING, OR CONDITIONING WHEAT, FLOUR, OR OTHER CEREALS.
APPLICATION FILED NOV. 23, 1903.
2 SHEETS—SHEET 2.
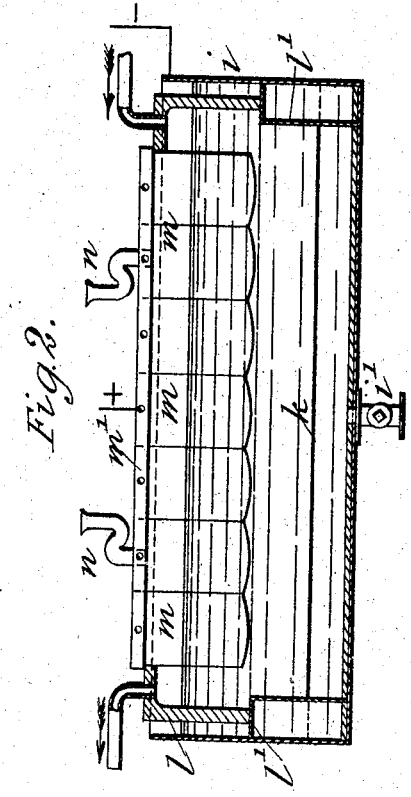
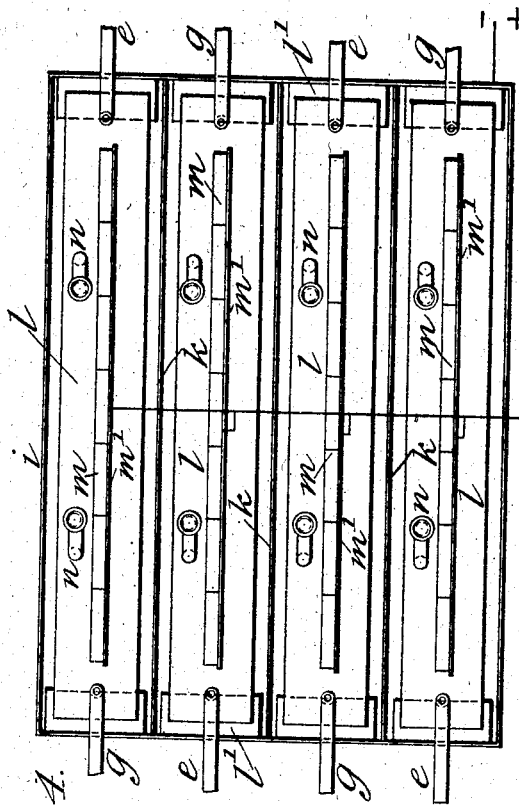
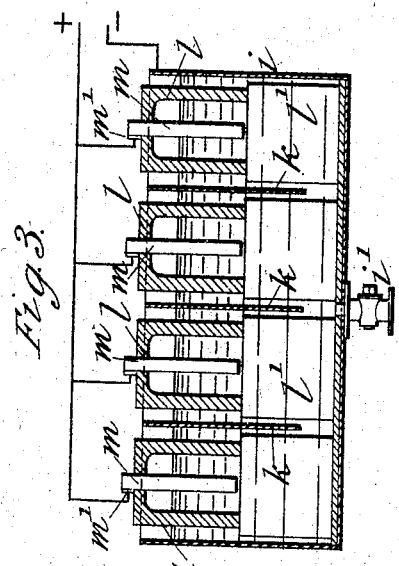
WITNESSES
INVENTOR
W. T. Mercier
by Bakewell Beynes
his att'ys

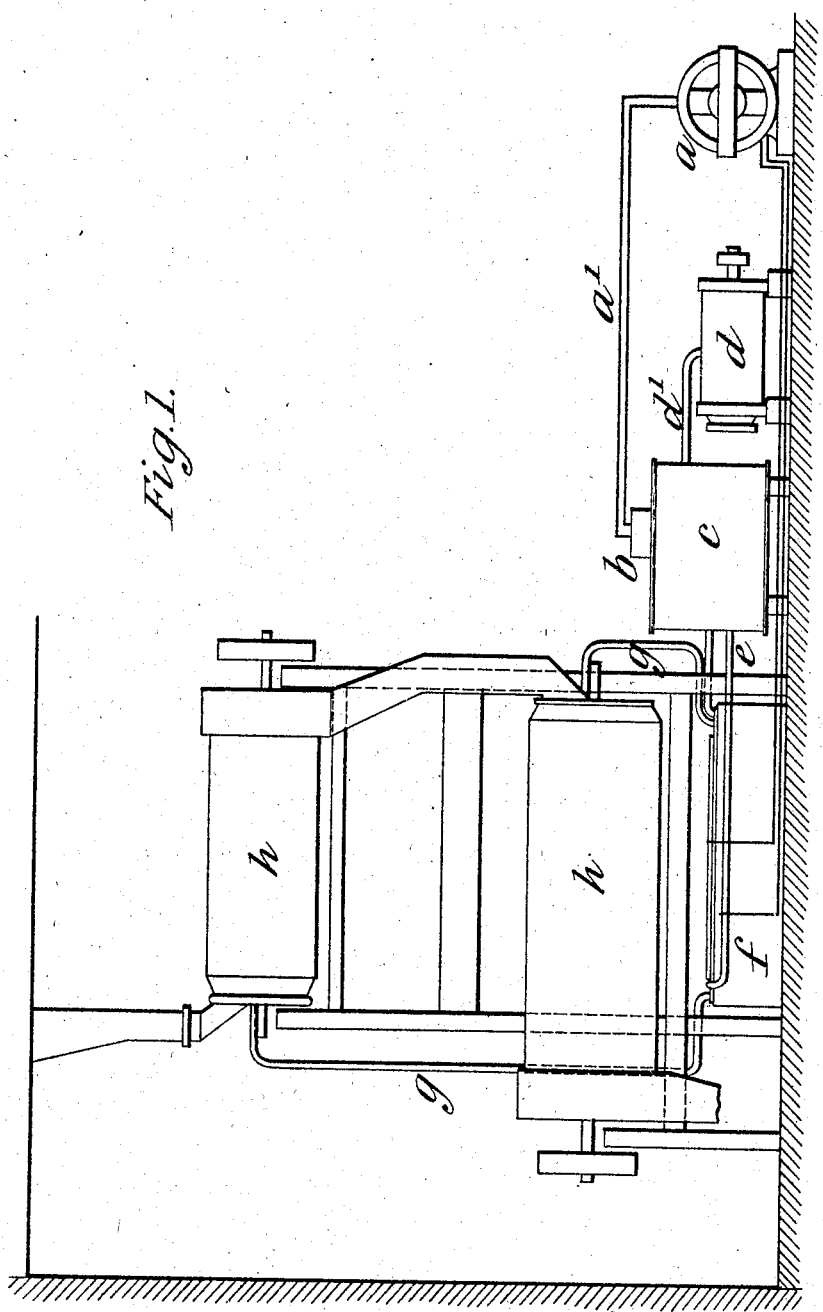

UNITED STATES PATENT OFFICE.

WILLIAM T. MERCIER, OF BELFAST, IRELAND, ASSIGNOR TO THE OZONISED OXYGEN COMPANY LIMITED, OF MANCHESTER, ENGLAND.

METHOD OF IMPROVING, BLEACHING, OR CONDITIONING WHEAT, FLOUR, OR OTHER CEREALS.

No. 796,339.　　　　　Specification of Letters Patent.　　　　　Patented Aug. 1, 1905.

Application filed November 23, 1903. Serial No. 182,219.

*To all whom it may concern:*

Be it known that I, WILLIAM TURPIN MERCIER, miller, a subject of the King of Great Britain and Ireland, residing at Dufferin Flour and Meal Mills, Belfast, Ireland, have invented a certain new and useful Method of Improving, Bleaching, or Conditioning Wheat, Flour, or other Cereals, (for which I have applied for a patent in Great Britain, filed July 2, 1903, No. 14,757,) of which the following is a specification.

It has been suggested to use ozone for sterilizing and bleaching cereals. The process therein set forth is, however, of little commercial value, for although a fairly good bleaching effect is attained a smell and taste are imparted to the cereal which are so persistent that they are still to be detected in the bread baked from the flour. It has also been suggested to bleach or condition flour by exposing it to chlorin. Such treatment, however, is injurious to the baking quality of the flour, the gluten therein being attacked by the chlorin.

By my invention the foregoing disadvantages inherent in the use of either ozone or chlorin alone are overcome by using a mixture of these two agents, to which mixture I expose the cereal. The chlorin does not appear to affect materially the bleaching and sterilizing effect produced by the ozone; but it is valuable in correcting the taste and smell imparted to the flour by the ozone. For this purpose the proportion of chlorin to ozone need not be large; but it varies with the kind of flour under treatment and is easily ascertained by an experiment with a sample of the flour.

To the chemical production of chlorin in a flour-mill there are several objections. Indeed the difficulty of obtaining chlorin chemically free from arsenic is considerable unless costly precautions are taken. I prefer, therefore, by my invention to obtain chlorin electrolytically.

Suitable apparatus for practicing my invention is shown in the accompanying drawings.

Figure 1 is a diagrammatic elevation of the apparatus used in my improved method; Fig. 2, a vertical longitudinal section; Fig. 3, a vertical transverse section, and Fig. 4 a plan, of the electrolytic tank forming part of the said apparatus.

Referring to Fig. 1, an alternating-current dynamo $a$ is connected by leads $a'$ to the primary of a transformer $b$, the secondary of which is connected to the terminals of the ozonizer $c$. The ozonizer is supplied with a current of air by means of the blower $d$ and pipe $d'$, the resulting ozonized air being led from the ozonizer by pipes $e$ to water-sealed chambers in the electrolytic tank $f$, from which after mixing with the gaseous products of electrolysis, as hereinafter described, the resulting gas or mixture of gases is led by pipes $g$ to a chamber $h$, in which the flour or other material to be treated is subjected to the action of the gas or gases.

The chamber $h$ is preferably one of a series of cylindrical chambers, such as are described in the specification to British Patent No. 10,323 of 1902, and the ozonizer-blower and electrical plant may be of any known suitable character.

The electrolytic tank $f$ consists of a wood box with iron plates on the sides or preferably of a plate-iron box or casing $i$, forming the cathode of the cell to which is connected a conductor leading to the minus pole of some suitable source of constant current. The bottom of the casing is covered with cement or other protective coating and is provided with a cock $i'$, by which the electrolyte can be run off when desired or its level altered. The wood box or casing is divided longitudinally into a number of compartments by iron-plate partitions $k$, which are fixed at each end to the box or casing, but do not reach to the bottom thereof. These plates are also connected to the minus cable or conductor above mentioned. In each compartment is placed an inverted box $l$, which may be of wood, preferably impregnated with paraffin, wax, or the like or of iron coated with an adherent cement, enamel, or other insulating material of slate with wood top or cover, which rests on flanges or supports $l'$ at either end of the casing. The mouths of these boxes are closed by the electrolyte, which may consist of brine or any other suitable solution, which under the action of an electric current evolves chlorin, the level of the electrolyte being regulated so as to leave a certain space unoccupied by electrolyte at the top of each box.

The tops of the boxes are slotted longitudinally for the reception of the carbon blocks $m$, the blocks in each cell being clamped or otherwise suitably fastened to a brass or copper bar $m'$ or cast into lead and the tops of the boxes being rendered gas-tight by means of a suitable cement. The bars $m'$ are electrically connected to the plus pole of the source of continuous current. The top of each box is also provided with a feed-hole in which may be fitted a siphon $n$, the feed-hole being sealed by the electrolyte contained in the limbs of the siphon or by a wood plug.

The siphons $n$, as well as the inlet-pipes $e$ from the ozonizer and the outlet-pipes $g$, are sealed into the tops of the boxes $l$ by means of a suitable cement, and the joints are otherwise rendered gas-tight.

When the electrolyzing-current is passed through the brine in the tank from the carbon anodes to the casing or plates, chlorin or a mixture of chlorin and oxygen is given off at the anodes and accumulates in the gas-chambers, where it mixes with the ozonized air from the ozonizer, the mixture passing through the outlet-pipes to the chambers in which the flour is treated. The gases evolved at the cathode do not pass into the gas-chambers, since no gas is evolved from the bottom of the casing, owing to its coating of cement, and the gas evolved at the sides and ends of the tank and plates passes up to the exposed surface of the electrolyte outside the boxes.

Having thus described the nature of this invention and the best means I know of carrying the same into practical effect, I claim—

1. The method of improving, bleaching or conditioning wheat, flour or other cereal, which consists in subjecting the material to the action of a mixture of ozone and chlorin.

2. The method of improving, bleaching or conditioning wheat, flour or other cereal, which consists in subjecting the material to the action of a mixture of ozone with chlorin generated by electrolysis.

3. The method of improving, bleaching or conditioning wheat, flour or other cereal, which consists in subjecting the material to the action of a mixture of ozone with chlorin generated by electrolysis of a solution of a common salt.

In testimony whereof I have signed my name to this specification in the presence of two subscribing witnesses.

WILLIAM T. MERCIER.

Witnesses:
 John McQuade,
 Wm. Kilmartin, Junr.